Figure 4:
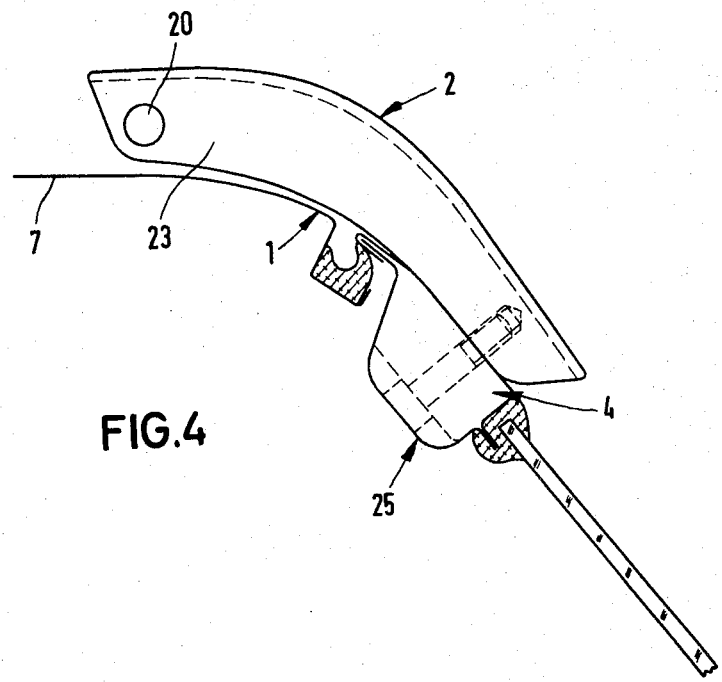

United States Patent [19]

Leissa

[11] 3,729,223

[45] Apr. 24, 1973

[54] HINGED REAR CLOSURE FOR VEHICLE BODIES

[75] Inventor: Hans-Egon Leissa, Roetgesbuettel, Germany

[73] Assignee: Volkswagenwerk Aktiengesellschaft, Wolfsburg, Germany

[22] Filed: Mar. 3, 1971

[21] Appl. No.: 120,595

[30] Foreign Application Priority Data

Mar. 20, 1970 Germany................P 20 13 277.8

[52] U.S. Cl. ....................296/1 S, 296/56, 296/106
[51] Int. Cl..........................B62d 35/00, B60j 5/10
[58] Field of Search....................296/1 S, 28 R, 56, 296/91, 106, 137, 146; 49/40, 384

[56] References Cited

UNITED STATES PATENTS

| | | | |
|---|---|---|---|
| 3,010,754 | 11/1961 | Shumaker | 296/91 X |
| 3,000,663 | 9/1961 | Lucchesi | 296/91 X |
| 3,059,562 | 10/1962 | Sturtevant | 296/91 X |
| 3,158,397 | 11/1964 | Peras | 296/106 |
| 3,326,599 | 6/1967 | Pashenne | 296/137 R |
| 3,427,067 | 2/1969 | Kish | 296/91 X |

FOREIGN PATENTS OR APPLICATIONS

| | | | |
|---|---|---|---|
| 1,403,032 | 5/1961 | France | 296/56 |
| 719,764 | 12/1954 | Great Britain | 296/28 R |
| 729,407 | 5/1955 | Great Britain | 296/28 R |
| 831,717 | 3/1960 | Great Britain | 296/106 |

*Primary Examiner*—Benjamin Hersh
*Assistant Examiner*—John A. Pekar
*Attorney*—Brumbaugh, Graves et al.

[57] ABSTRACT

In a motor vehicle body having a hinged rear closure panel supported from the body for swinging movement about a horizontal axis between its opened and closed positions, the vehicle roof is provided with laterally spaced longitudinal ridges along opposite sides thereof. The rear closure panel is provided with hinge members which project upwardly and forwardly therefrom between these ridges and are pivotally connected to the respective ridges to support the closure panel for swinging movement about a horizontal axis which is displaced above and forwardly of the closure panel so that the latter may be swung upwardly to an open position in which both the panel and its hinged structures are entirely removed from the rear opening of the vehicle normally covered by the closure panel. An air deflector carried by the hinges between the said ridges is spaced above the roof and curves downwardly in spaced relation to the rear closure panel to define an air flow passage through which air moving rearwardly over the roof is deflected downwardly across the closure panel.

7 Claims, 5 Drawing Figures

Patented April 24, 1973
3,729,223
2 Sheets-Sheet 1
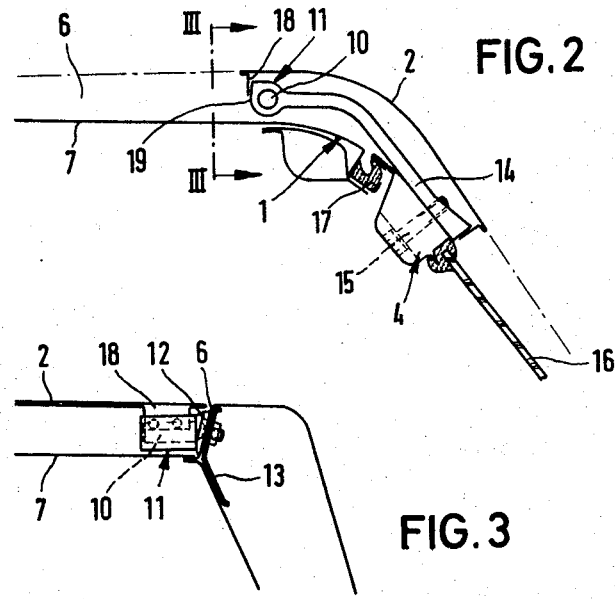
FIG. 2
FIG. 3
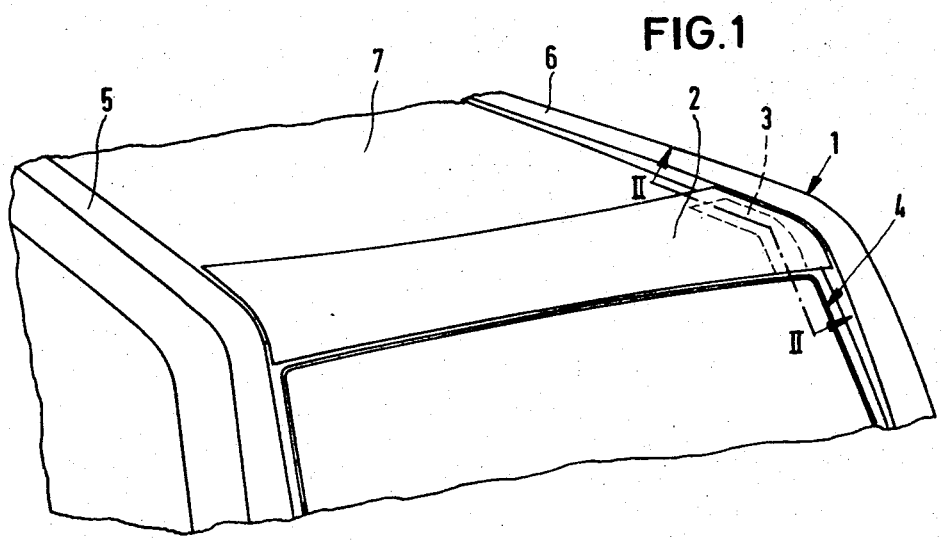
FIG. 1
INVENTOR
BY Hans-Egon Leissa
Watson, Cole, Grindle & Watson

HINGED REAR CLOSURE FOR VEHICLE BODIES

The invention relates to a vehicle body with a hinged rear closure panel or plate which is connected to the body for swinging movement from its closing position over the rear opening of the body to an open position, substantially at or above the horizontal plane of the vehicle roof. Although intended primarily for use on motor vehicles, the invention is adapted also for advantageous application to house trailers or other vehicle bodies.

In order to provide as unimpeded an entry as possible to the inside of the vehicle, beneath the raised or upwardly swung closure panel, it is desirable to locate the horizontal hinge axis of this panel at as high a location as possible. Thus, it has been known to provide hinges in the form of relatively aligned pivots on opposite sides of the rearward opening which is normally covered by the closure panel. This expedient, however, involves an expensive construction, while, at the same time, the location of the hinges within the opening will nevertheless serve as a partial obstruction to the opening.

The invention is directed to the problem of creating a vehicle body of the above described type which permits swinging of the hinged rear closure panel about an axis above the rear opening of the vehicle body at or above the level of the roof of the vehicle and which, therefore, will eliminate obstruction of the rear opening by the hinge means. This problem is solved according to the invention by an air deflector or baffle plate disposed above the car roof and connected to the hinged rear panel or closure for swinging movement therewith, being connected preferably to the hinges thereof. The hinge pintles preferably are disposed in the space or air flow passage defined between the baffle plate and the roof of the vehicle, just above the rearward vehicle opening. The baffle plate serves to deflect air downwardly across the closure panel or plate and when the latter is provided with a window, the stream of deflected air is deflected for the purpose of automatic cleaning of the window and of avoiding fogging or icing thereof. According to the invention, the forward portion of the baffle plate or deflector is spaced above and generally parallel to the roof and its rear portion is curved downwardly generally parallel to the rear closure panel to deflect air downwardly across the rear window thereof.

In the preferred embodiment of the invention, the vehicle body is provided with laterally spaced apart portions or ridges projecting upwardly from the roof on opposite sides thereof to the level of the forward portion of the deflector. Axially aligned pivot pins or pintles for the hinges project inwardly from the ridges horizontally into the space berween the roof and the deflector. It is to be noted that the said ridges need not constitute extensions of the side walls of the vehicle but may advantageously be defined by suitably profiling the roof of the vehicle.

It is desirable that the ridges extend parallel to each other over the entire length of the vehicle roof. For practical purposes, therefore, they define the opposite lateral sides of an air flow channel for the stream of the air produced by forward motion of the vehicle, while the air baffle plate or deflector closes the upper side of such channel in the area of the upper rear edge portion of the body and functions to deflect air downwardly across the rear window. In accordance with one embodiment of the invention, the air deflector is formed separately from the hinge members and suitably connected thereto to extend between and be supported by the hinge members which, in turn, are rigidly connected with the rear closure plate or panel. For this purpose, the deflector may have portions at its leading edge which project downwardly in front of and are secured to the respective hinge members.

In another embodiment, the hinge elements and the air baffle or deflector constitute a unitary structure, in which the hinge members are at opposite sides of the air baffle.

In order to prevent the entry of water into the interior of the vehicle, especially when the hinged rear closure of the panel is opened, a further advantageous feature of the invention resides in the disposition of the upper edge of the hinged rear closure panel below the air baffle or deflector, together with the provision of an elastic packing between the closure panel and the roof, in which the packing is shaped to define a transversely extending drainage trough.

Specific embodiments of the invention are shown by way of exemplification in the accompanying drawings, in which:

FIG. 1 is a perspective view of the rear end of a station wagon body to which the invention is applied.

FIGS. 2 and 3, respectively, are cross-sections on the lines II—II and III—III of FIG. 1, showing the preferred embodiment of the invention.

Figure 5:
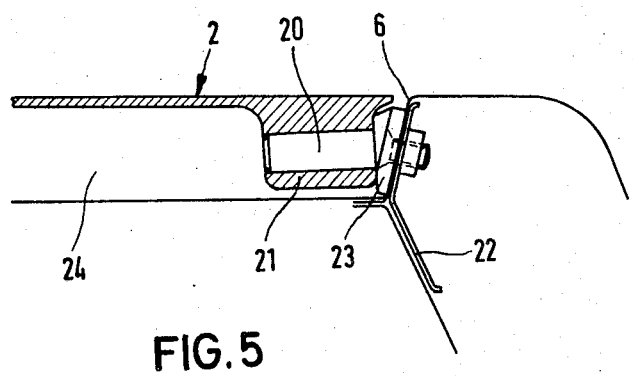

FIGS. 4 and 5, respectively, are views similar to FIGS. 2 and 3 but illustrating a modified embodiment of the invention.

Referring now in detail to the drawings, and particularly to FIG. 1, there is shown the rear portion of the body of a passenger vehicle, namely a station wagon, in the region of the rear or trailing edge 1 of the roof above the usual opening in which the rear closure panel or plate 4 is swingably mounted by hinges 3 for movement between open and closed positions.

In accordance with the invention, the vehicle body has laterally spaced apart ridges 5 and 6 which are parallel and which, in the present embodiment, extend for the entire length of the roof 7 to define the opposite side walls of an air flow channel in which the roof 7 forms the bottom.

In the embodiment of the invention shown in FIGS. 2 and 3, the hinges 3, respectively, are disposed adjacent the ridges 5 and 6, each hinge consisting of the pivot or pintle 10 and the hinge member 11 journalled on said pivot 10 or pintle 10. Each pivot pin or pintle 10 has a rigid base 12 which is screwed or otherwise secured through the inner face of its ridge 6 at a location where the latter is internally strengthened by a reinforcement 13.

As shown in FIG. 2, the hinged rear closure panel or plate 4 is screwed or otherwise firmly secured as at 15, to the hinge members or elements 11. Such connection of the hinges or hinge members 11 to the rear closure plate is at a location above the rear window 16 which constitutes a portion of and is framed in a known manner by the closure panel 4.

The forward ends of the hinge members 3 are respectively journalled on the relatively aligned horizontal pivot pins 10—10, affixed respectively to the ridges 5 and 6, to define a horizontal axis about which the closure panel 4 is swung to and from its closed position.

As is further shown in FIG. 2, an air baffle or deflector 2 extends rearwardly from adjacent the horizontal axis defined by the transversely aligned hinge pintles 10 and thence is curved downwardly substantially parallel to the rear closure panel 4 so that a continuous stream of air is guided through the air flow passage defined between the curved air deflector 2 on the one hand and the roof 7 and closur panel 4 on the other hand. Thus, a continuous rearward and downward flow of air is directed downwardly across the window 16 incident to forward motion of the vehicle.

It will be noted from the foregoing that the horizontal swinging axis defined by the hinge pintles 10—10 is displaced forwardly of and above the upper edge of the rear closure panel 4 when the latter is in its closed position as shown in FIG. 1.

Thus, the hinge pintles and, in fact, all portions of the hinges are removed from obstructing relation in the opening which is closed by the closure panel 14. In other words, it is possible to swing the hinge rear closure panel 4 upwardly to a raised open position at or above the level of the rear end edge portion 1 of the vehicle roof, so that the opening at the rear of the vehicle, is completely unobstructed either by the rear closure panel or the hinges for same.

For preventing entry of moisture into the vehicle body when the rear closure or closure panel 4 is opened, there is provided a resilient packing 17 of channel shaped cross-section defining a transversely extending gutter or drain trough for moisture received from the roof 7. Also, in the closed condition of the closure panel 4, as shown in the drawings, the packing 17 eliminates the possibility of heavy rain being driven into the vehicle interior 16 by the wind action.

In the preferred embodiment of FIGS. 2 and 3, the air baffle or deflector 2 includes at its forward end edge downwardly directed flanges 18, each of which is firmly secured, as by means of screws, to its associated hinge member 11. Thus, the mounting of the air deflector or baffle 2 is of simple and economically fabricated construction and functions to cover and shield the hinges.

In the embodiment of FIGS. 4 and 5 there is shown a modified arrangement in which the air deflector 2 and the hinge members 23 are formed as a unitary structure, the hinge members 23, in such arrangement extending longitudinally with respect to the vehicle body and beneath the deflector 2 on opposite sides thereof. As in the preceding embodiment, the vehicle body is provided with ridges 5 and 6, between which the baffle or deflector 2 is swingably disposed, the hinge pins or pintles 20 having their bases 23 affixed to the opposing walls of the ridges 5 and 6 at locations where these walls are reinforced by means of the internal reinforcements 22, substantially as in the preceding embodiment. It will be apparent that here the air flow passage 24 beneath the baffle 2 is laterally limited or defined by the relatively spaced hinge members 21 which assume the form of ribs integral with the remainder of the baffle 2. Such a unitary structure of ribs 21 and deflector 2 is adapted for production from a suitable metal, such as aluminum, by means of die-casting.

The rear or trailing ends of the respective hinge members 23, are connected by screws 25 with the rear closure panel or plate 4. It will be apparent, thereofre, that in both this and the preceding embodiment, the deflector 2 and the hinge members rigidly connected therewith, form a forward and upward extension of the rear closure panel 2, while, nevertheless, providing an air flow passage therebeneath for air downwardly across the panel 4 and its window.

In this application, there have been specifically illustrated and described but a limited number of embodiments of the invention. However, it will be readily understood by those skilled in the art that the invention is capable of still other and different embodiments, and is capable of variations as to its several details, as for instance, relative reversal of the pivot pins and their respective journal portions on the hinge members, all without departing from the scope of the invention, as defined in the accompanying claims.

Having thus described my invention, I claim:

1. In a motor vehicle body with a hinged rear closure panel supported from the roof of said body by hinges for swinging movement about a horizontal axis from its closed position to an open position near the level of the vehicle roof; the improvement which comprises an air baffle associated with said rear closure panel for swinging movement therewith, said baffle extending forwardly over said roof and spaced thereabove; and hinges affixed to said closure panel and pivoted to said vehicle body, said hinges lying in the space between said baffle and said roof to define an axis of swinging movement for the closure panel at a location in said space and including hinge members rigidly connected to and projecting forwardly from said rear 2. A vehicle body according to claim 1, in which the body has relatively laterally spaced ridges at substantially the level of the forward edge of the air baffle, there being coaxially aligned pivot pins affixed to the respective ridges and projecting into the space between said air baffle and the roof, said hinge members being journalled on said respective pivot pins to define an axis of swinging movement for the closure panel adjacent the forward edge of said baffle.

3. A motor vehicle body as defined in claim 2 in which the said ridges extend for the entire length of the said roof.

4. A motor vehicle body according to claim 2 in which said air baffle and said hinge members constitute a unitary structure to which said hinged rear closure panel is rigidly attached.

5. A motor vehicle body according to claim 1, in which the upper edge of said hinged rear closure panel is disposed adjacent the rear end edge of said roof below the said baffle, and including an elastic packing interposed between said hinged rear closure panel and said rear end edge, said packing being of channeled cross-section defining an upwardly directed transversely extending drainage trough.

6. In a vehicle body having a generally horizontal roof and a generally flat rear closure panel hinged to said body for swinging movement about a horizontal axis adjacent the rear end edge of the roof between a closed position in which said panel extends downwardly below the roof and an open position at or above the horizontal level of the roof; the improvement which comprises a pair of parallel longitudinal ridges projecting above and relatively spaced apart on opposite sides of said roof; a pair of hinge members secured to said panel in horizontally spaced relation and projecting therefrom to locations between said ridges, and being pivotally connected to the respective ridges to define said horizontal axis at a location forwardly of and above the panel; and a curved air deflector which, in the closed position of said rear closure panel, extends rearwardly from adjacent said horizontal axis generally parallel to said roof and thence downwardly generally parallel to said closure panel, in spaced relation to said roof and to said closure panel to define between the deflector and the roof and closure panel an air passage through which air passing over the roof, during forward movement of the vehicle body, is deflected downwardly across the surface of said panel, the pivotal connections of said hinge members to the said ridges being disposed between said deflector and the roof.

7. The improvement defined in claim 6, in which said hinge members and said panel constitute integral portions of a unitary structure.

* * * * *